United States Patent [19]
Brown et al.

[11] Patent Number: 5,497,675
[45] Date of Patent: Mar. 12, 1996

[54] ENERGY ABSORBER FOR A STEERING COLUMN

[75] Inventors: Kiel L. Brown, Troy; E. Judy Jordan-Brunson, Auburn Hills; Timothy A. Potok, Berkley; Steven F. Snyder, Rochester Hills, all of Mich.

[73] Assignee: Chrysler Corporation, Highland Park, Mich.

[21] Appl. No.: 254,730

[22] Filed: Jun. 6, 1994

[51] Int. Cl.[6] .................................................. B62D 1/19
[52] U.S. Cl. .................... 74/492; 280/777; 403/2; 188/371
[58] Field of Search .............. 74/492; 280/777; 403/2; 188/371, 373, 376

[56] References Cited

U.S. PATENT DOCUMENTS

| | | | |
|---|---|---|---|
| 4,703,669 | 11/1987 | Hyodo | 188/371 X |
| 4,951,522 | 8/1990 | Chowdhury | 74/492 |
| 5,390,956 | 2/1995 | Thomas | 74/492 |
| 5,417,452 | 5/1995 | Khalifa et al. | 188/371 X |

FOREIGN PATENT DOCUMENTS

| | | | |
|---|---|---|---|
| 1936994 | 7/1969 | Germany | 74/492 |

Primary Examiner—Rodney H. Bonck
Assistant Examiner—David Fenstermacher
Attorney, Agent, or Firm—Edward A. Craig

[57] ABSTRACT

An energy absorbing device for the steering column of an automotive vehicle comprises a pair of generally U-shaped straps made of relatively stiff, bendable, flexible strip material. One leg of each strap is connected to a bracket affixed to vehicle support structure. The other leg is connected to the steering column. In a collision, the straps resist movement of the steering column and gradually absorb energy to prevent excessive reaction forces of the steering column against the driver. A connection between the steering column and the bracket prevents vibration of the steering column during normal operation of the vehicle. This connection is releasable in response to initial vehicle impact to allow controlled movement of the steering column under the restraining influence of the straps.

5 Claims, 4 Drawing Sheets

5,497,675

1

ENERGY ABSORBER FOR A STEERING COLUMN

FIELD OF THE INVENTION

This invention relates generally to energy absorbing devices and refers more particularly to an energy absorbing device for the steering column of an automotive vehicle.

BACKGROUND AND SUMMARY

When a crash or collision occurs, the driver of an automobile is often thrown forward against the steering column with great impact. Also, the engine may be pushed rearwardly, moving the steering column with it.

The energy absorbing device of this invention is designed to allow movement of the steering column in response to vehicle impact due to rearward movement of the engine or the force of the driver against the steering wheel, but with a controlled resistance, gradually absorbing energy to prevent excessive reaction force against the driver.

More specifically, the energy absorbing device of this invention comprises a pair of generally U-shaped straps made of a relatively stiff, bendable, flexible strip material. One leg of each strap is connected to a bracket secured to rigid vehicle support structure. The other leg is connected to the steering column. When the driver is thrown forwardly and the steering column shifts as sometimes happens in a head-on collision, the straps resist and absorb energy gradually, providing a controlled reaction force against the driver. The energy absorbing device also resists in a controlled manner tilting of the steering column which also often occurs in a front end collision.

The device of this invention also includes vibration-inhibiting means for rigidly holding the steering column against movement during normal operation of the vehicle, to thereby eliminate any tendency of the steering column to vibrate. The vibration-inhibiting means is releasable under initial vehicle impact to permit the restraining influence of the energy absorbing straps to take over.

One object of this invention is to provide an energy absorbing device having the foregoing features.

Another object is to provide an energy absorbing device for a steering column which is composed of a relatively few simple parts, can be easily and inexpensively manufactured, and is highly effective in controlling the shifting movement of the steering column in a collision.

Other objects, features and advantages of this invention will become more apparent from the following description and claims, especially when considered with the accompanying drawings.

2

Figure 4:
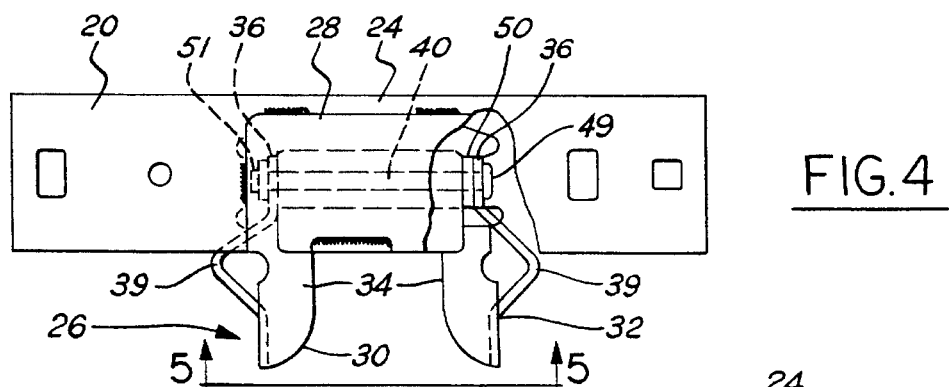
FIG. 4 is a view similar to a portion of FIG. 3 with parts broken away.
Figure 5:
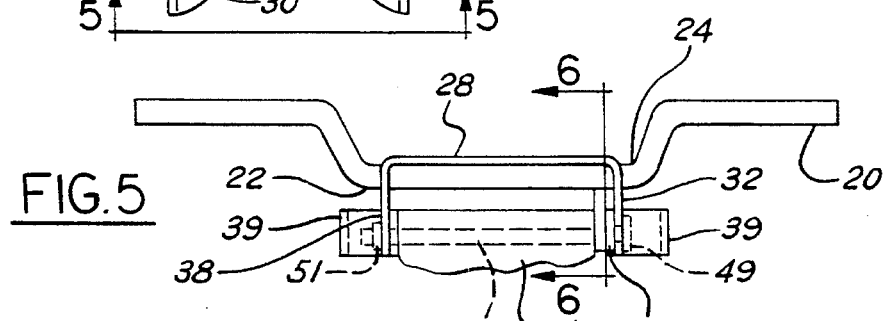

FIG. 5 is a view taken on the line 5—5 in FIG. 4.

Figure 6:
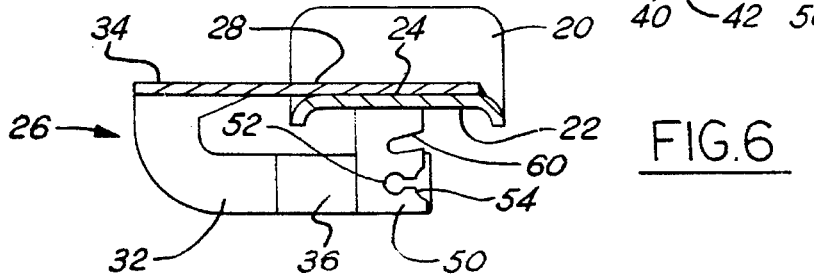

FIG. 6 is a sectional view taken on the line 6—6 in FIG. 5.

Figure 7:
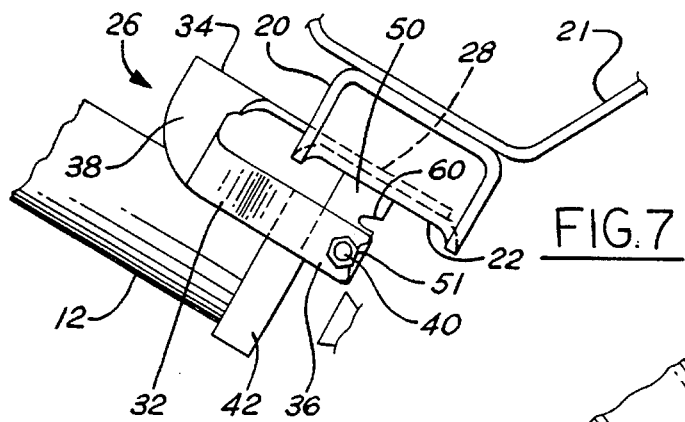

FIG. 7 is a fragmentary view, showing the front end of the steering column in the normal position prior to a collision.

Figure 8:
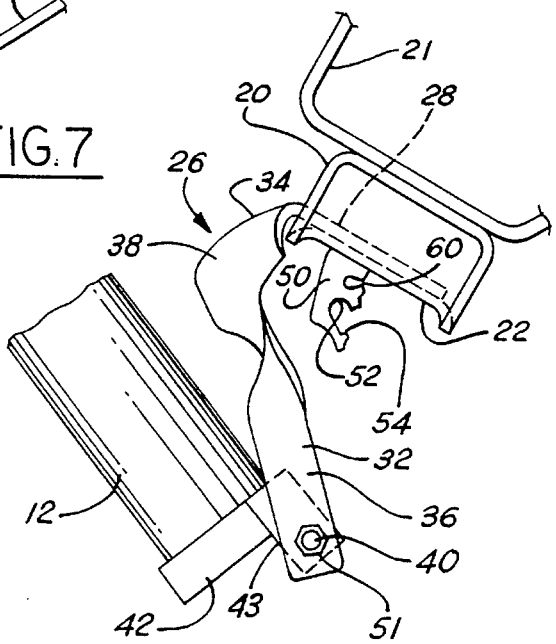

FIG. 8 is a view like FIG. 7 but shows the position of the steering column and one of the straps of the energy absorbing device after the steering column has moved from its normal position in a collision.

Figure 9:
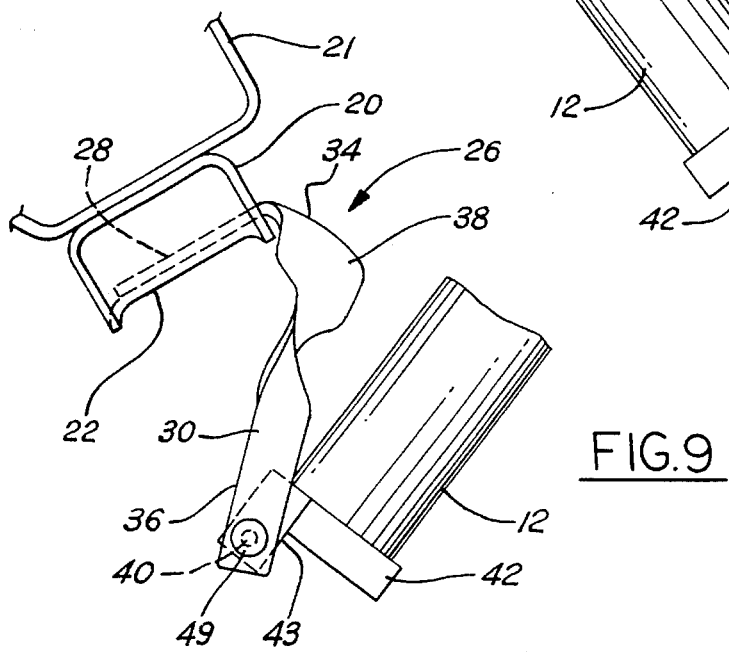

FIG. 9 is a view of the structure of FIG. 8 as seen from the other side and showing the other strap.

Figure 10:
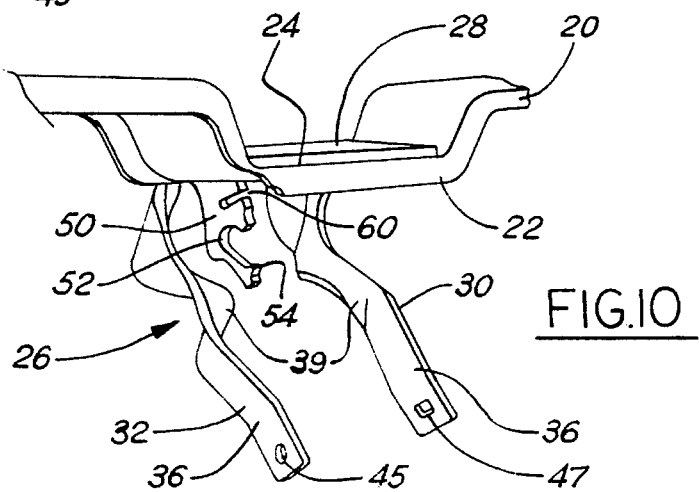

FIG. 10 is a perspective view of the energy absorbing device in its extended or stretched condition.

DETAILED DESCRIPTION

Referring now more particularly to the drawings, a steering column assembly 11 has a tubular steering column 12. A steering shaft 14 extends through the tubular steering column 12 and is connected to a steering wheel 16 at the upper end and to a shaft coupler 18 at the lower end. The shaft coupler is operatively connected to a steering gear assembly (not shown) to steer the front wheels of an automotive vehicle. The steering column 12 normally extends in a fore and aft direction or lengthwise relative to the vehicle at an upward and rearward inclination.

Above and near the lower end of the steering column 12 is a laterally extending bracket 20. Bracket 20 is secured to rigid vehicle support structure which in this instance is a dash panel 21. Bracket 20 extends perpendicular to the steering column 12 and has a depressed central portion 22 which is spaced directly above the steering column. The central portion 22 of bracket 20 has a top planar surface 24 which is parallel to the steering column.

An energy absorbing device 26 for the steering column is mounted on the bracket 20. Energy absorbing device 26 has a flat plate 28 which is rigidly secured to surface 24 of the central depressed portion 22 of bracket 20 as by welding, and also has a pair of integral energy absorbing straps 30 and 32. Straps 30 and 32 are generally U-shaped, each having a first leg 34, a second leg 36 and an intermediate portion 38 connecting the legs. The straps are laterally spaced apart and disposed on opposite sides of the steering column 12.

Figure 1:
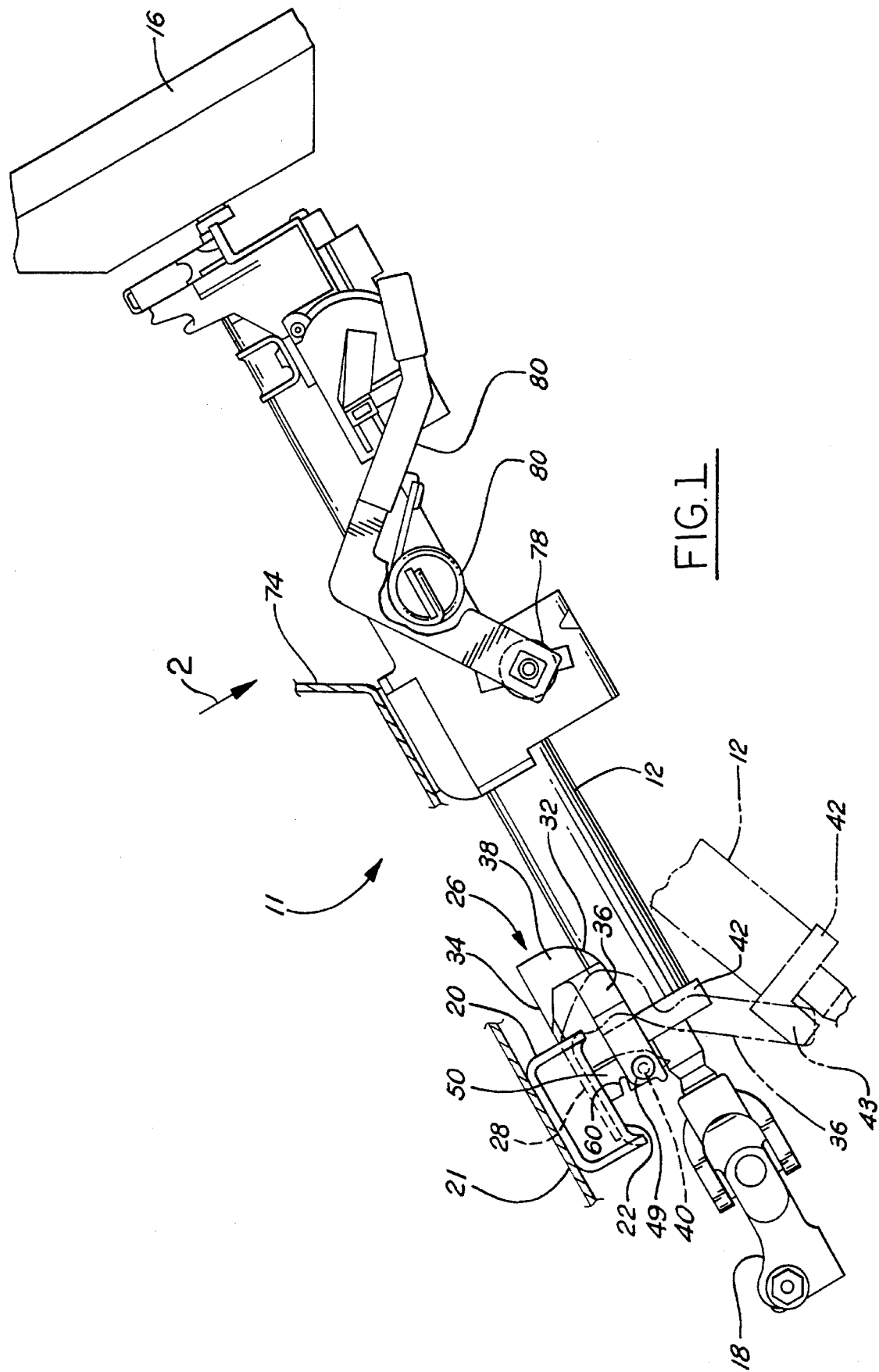
FIG. 1 is a side elevational view, with parts broken away and in section, of a steering column of an automotive vehicle, having an energy absorbing device constructed in accordance with the invention, and showing in broken lines the steering column in a shifted position after collision.
Figure 2:
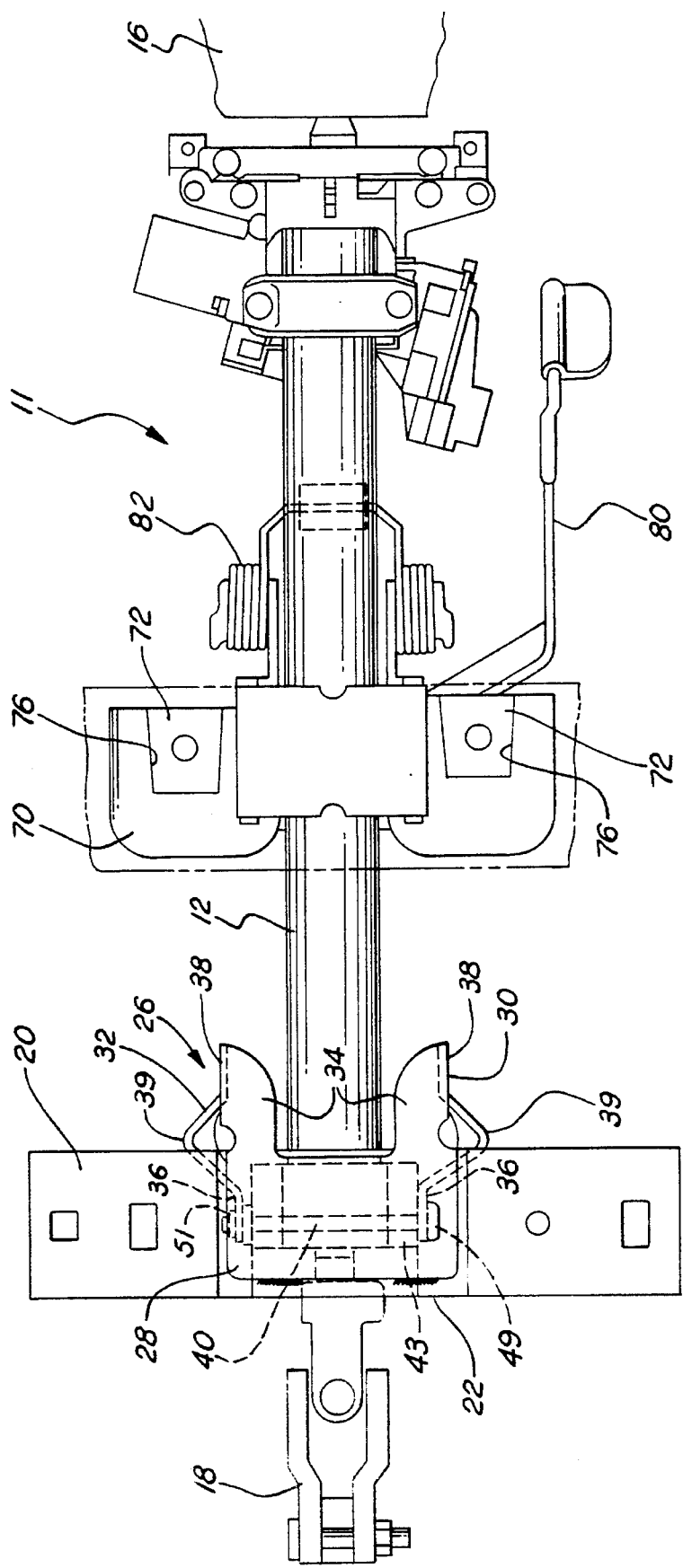
FIG. 2 is a top view taken in the direction of the arrow 2 in FIG. 1.
Figure 3:
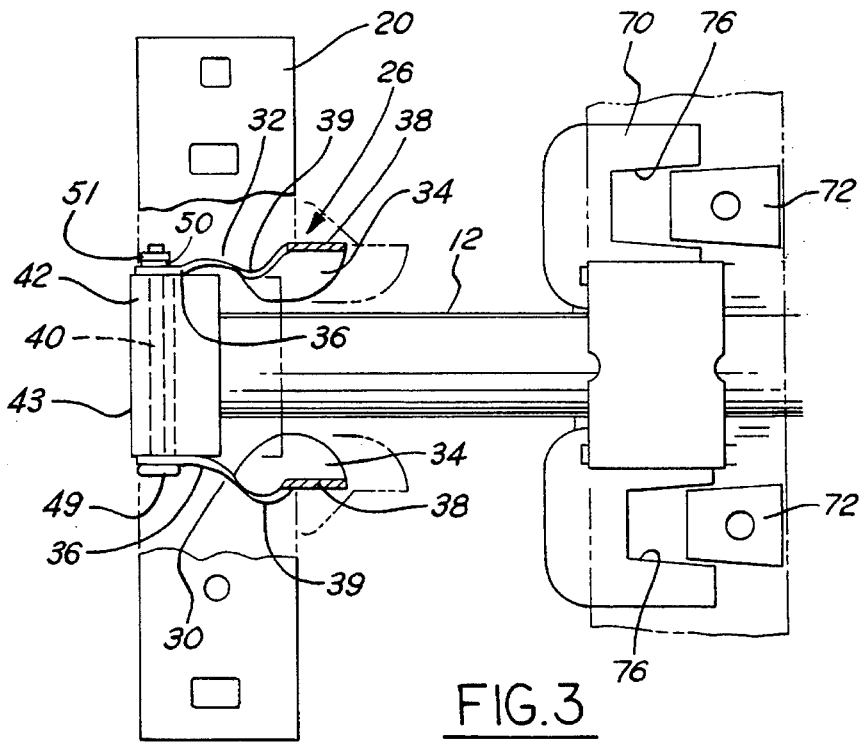
FIG. 3 is a view showing a portion of the structure in FIG. 2, but with the steering column shifted forwardly from the normal position which is shown in broken lines.

The entire energy absorbing device 26 including plate 28 and straps 30 and 32 is made of relatively stiff, bendable, flexible material bent to the configuration shown. Legs 34 and 36 are generally parallel when viewed from the side as in FIG. 1. The legs 34 have their front ends integrally connected to plate 28 and extend rearwardly in parallel relation to one another and in the plane of plate 28. Legs 34 are above and parallel to the steering column on opposite sides thereof. The intermediate portions 38 of straps 30 and 32 are integrally joined to and extend downwardly from the laterally outer edges of the legs 34 at the rear extremities of legs 34. Intermediate portions 38 are in laterally spaced apart vertical planes parallel to the steering column 12, and are substantially perpendicular to both legs 34 and 36.

Legs 36 have their rear extremities integrally connected to intermediate portions 38 and extend generally parallel to the steering column on opposite sides thereof at about the same level as the top surface of the steering column. The legs 36 are formed between the ends with generally V-shaped laterally outwardly extending crimps 39. These crimps straighten when the straps are in tension during shifting movement of the steering column as explained more fully hereinafter.

The front ends of the legs 36 are connected by a fastener in the form of a pivot pin 40. The steering column 12 has a fixed bracket 42 on the front end, provided with a bracket flange 43. The pivot pin 40 extends through holes 45 and 47 in the front ends of legs 36 and through bracket flange 43, so that the pivot pin 40 pivotally connects the front ends of legs 36 of straps 30 and 32 to the steering column. The pivot pin has a head 49 on one end and a nut 51 is threaded on the other end.

Rigidly secured to the bracket 20 is a post in the form of a flat finger 50 which extends downwardly from the bracket toward the pivot pin 40. The finger 50 is disposed vertically and extends between the front end of leg 36 of the strap 32 and the flange 43 of bracket 42. The finger has a hole 52 which receives the pivot pin 40. A slot 54 extends from the hole 52 to the rear edge of the finger. As best seen in FIG. 6, the hole 52 is more than 180° in extent and thus retains the pivot pin and thereby holds the steering column 12 from movement relative to the stationary bracket 20. This prevents vibration of the steering during normal operation of the vehicle. In a frontal impact of sufficient force, however, the steering column 12 will move to the position shown in dotted lines in FIG. 1. The finger 50 will release and permit this movement of the steering column because the slot 54 will open enough to allow the pivot point to escape hole 52 in the finger. The finger is made of a relatively stiff, bendable, flexible material to permit this opening of the slot.

The finger 50 has a notch 60 in its rear edge adjacent to the slot 54. Notch 60 facilitates the opening of the slot 54 to release pivot pin 40 when a front end collision occurs, permitting any collapse or shift of the steering column to proceed gradually under the restraining influence of straps 30 and 32.

FIG. 7 shows the position of the forward end of the steering column 12 and of the energy absorbing device 26 during normal operation of the vehicle. The finger 50 secures the steering column 12 directly to the bracket 20, in effect by-passing the energy absorbing device 26, and prevents the steering column from vibrating. However, immediately upon initial impact in a front end collision, the pivot pin 40 breaks away from the finger (see FIG. 8) so that the steering column is capable of being moved by the rearward movement of the engine or by the force of the driver against the steering wheel, but with a controlled resistance imposed by the straps 30 and 32 to gradually absorb energy and prevent excessive reaction force against the driver.

As noted in FIGS. 8–10, when the steering column shifts downwardly and forwardly as shown in FIGS. 8 and 9 in a crash, the legs 34 bend downward, the angle between the legs 34 and 36 opens from the normal 90° to something substantially in excess of 90°, and the crimps 39 in legs 36 straighten. The straps can stretch at least 2½" while controlling the shifting movement of the steering column. The crimps increase the amount of stretch available.

A cross member 70 may be secured to the steering column 12. Slides 72 affixed to the vehicle support structure 74 in a manner not shown engage slots 76 in the cross member and permit the forward movement of the steering column in the event of a collision. The steering column 12 may be locked in an adjusted, tilted position by a releasable locking device 78 operated by a handle 80. A spring unit 82 urges the steering column upwardly when the locking device is released.

The invention claimed is:

1. An energy absorbing device for an elongated steering column which extends lengthwise within an automotive vehicle that has vehicle support structure, comprising:

a bracket secured to the vehicle support structure adjacent to and above the steering column, first and second elongated energy absorbing straps made of a relatively stiff, bendable flexible strip material, each strap having a first end and a second end, said straps being generally U-shaped and each having a first elongated leg, a second elongated leg, and an intermediate portion connecting said first and second legs, said straps being laterally spaced apart and disposed respectively on opposite sides of the steering column, means securing the first end of each strap to said bracket, the first leg of each strap being disposed above the steering column and extending from the first end thereof rearwardly to the rearmost extremity of said first leg and in generally parallel relation to the steering column, means connecting the second end of each strap to the steering column, the second leg of each strap being disposed below the first leg thereof and extending from the second end thereof rearwardly to the rearmost extremity of said second leg and in generally parallel relation to the steering column whereby said first and second legs are generally parallel to one another, said intermediate portion of each strap interconnecting the rearmost extremities of the first and second legs thereof, said intermediate portion of each of said straps being generally perpendicular to the first and second legs thereof, said intermediate portions of said straps being disposed generally vertically and said second legs of said straps being disposed generally vertically, said straps in a collision resisting movement of the steering column gradually absorb energy to prevent excessive reaction forces of the steering column against the driver.

2. An energy absorbing device as defined in claim 1, wherein said second leg of each strap has a generally V-shaped crimp between said second end and said intermediate portion of said strap, said crimp being capable of straightening under tension.

3. An energy absorbing device as defined in claim 1, wherein said means connecting the second end of the straps to the steering column comprises a fastener, and vibration-inhibiting means connecting said steering column to said bracket to inhibit vibration of the steering column during normal operation of the vehicle, said vibration-inhibiting means comprising a post rigidly connected to said bracket, said post having an aperture, said aperture receiving the fastener and being partially open on one side but encompassing more than 180° of said fastener to normally retain said fastener and thereby positively hold the steering column from moving relative to the bracket to inhibit vibration during normal vehicle operation but opening further under initial vehicle impact to release the fastener and allow controlled movement of the steering column under the restraining influence of said straps, said post being in the form of a flat finger having a side edge and also having said aperture therein, said aperture being partially open by a slot in said finger extending from said aperture through said side edge of the finger, said finger being made of relatively stiff, bendable, flexible, strip material permitting said slot to widen under initial vehicle impact to release the fastener, said side edge of said plate having a notch therein adjacent to but spaced from said slot to facilitate widening of said slot under initial vehicle impact.

4. An energy absorbing device as defined in claim 3, wherein said second leg of each strap has a generally V-shaped crimp between said second end and said intermediate portion of said strap, said V-shaped crimps being capable of straightening out under tension.

5. An energy absorbing device as defined in claim 4, wherein said first end of each strap is secured to said bracket by a plate, said plate being rigidly mounted on said bracket and said first end of each strap being integrally joined to said plate.

* * * * *